(12) United States Patent
Kelsey et al.

(10) Patent No.: US 6,546,294 B1
(45) Date of Patent: Apr. 8, 2003

(54) LIFE CYCLE MONITOR FOR ELECTRONIC EQUIPMENT

(75) Inventors: Cavan A. Kelsey, Churchville, NY (US); James R. Milch, Pittsford, NY (US); Dale B. Parks, Dansville, NY (US); Donna M. Timmons, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/526,893

(22) Filed: Mar. 16, 2000

(51) Int. Cl.[7] .............................................. G05B 11/01
(52) U.S. Cl. ...................... 700/27; 396/203; 396/311; 396/319; 396/429; 348/231.3; 348/231.5
(58) Field of Search ................................. 235/375–376, 235/449, 493; 396/207, 210, 310–311, 319, 429, 201–203; 378/162; 700/259, 27; 348/371, 231.3–231.5

(56) References Cited

U.S. PATENT DOCUMENTS

| | | | | |
|---|---|---|---|---|
| 5,021,811 A | * | 6/1991 | Maurinus et al. | 396/6 |
| 5,654,902 A | | 8/1997 | Scheidt et al. | 702/82 |
| 5,715,488 A | * | 2/1998 | Sasaki et al. | 396/319 |
| 5,940,638 A | * | 8/1999 | Kim | 396/207 |
| 5,965,859 A | * | 10/1999 | DiVincenzo et al. | 235/380 |
| 6,054,990 A | * | 4/2000 | Tran | 345/863 |
| 6,128,446 A | * | 10/2000 | Schrock et al. | 396/297 |

FOREIGN PATENT DOCUMENTS

DE 19820217 A * 11/1999 ............ G03B/1/00

* cited by examiner

*Primary Examiner*—Wilbert L. Starks, Jr.
*Assistant Examiner*—Crystal J Barnes
(74) *Attorney, Agent, or Firm*—Thomas H. Close

(57) ABSTRACT

A system for monitoring the life cycle of an electronic apparatus of the type that creates an output data record such as an exposed photographic film, or a digital data, sound or image file, includes a sensor in the electronic apparatus for monitoring the operation and condition of the apparatus to produce operational data; means in the electronic apparatus for appending the operational data to the data record; a data record utilization device that receives and operates on the data record; and a digital processor in the data record utilization device having a software agent that retrieves the operational data from the data record, processes the operational data and produces a message related to the life cycle of the product.

22 Claims, 2 Drawing Sheets

LIFE CYCLE MONITOR FOR ELECTRONIC EQUIPMENT

FIELD OF THE INVENTION

The invention relates to electronic equipment monitoring apparatus and more particularly to apparatus for monitoring the life cycle of electronic equipment of the type that creates an output data record.

BACKGROUND OF THE INVENTION

Environmental directives requiring extended producer responsibility for electronic equipment are developing in Europe, Japan, and other regions of the world. These directives, designed to reduce the environmental impact of electronic goods, will force producers to pay for proper disposal and/or recycling of their electronic goods at the end of their useful life. The emerging European Directive on Waste Electrical and Electronic Equipment (WEEE Directive) also required producers to "set up systems so that last holders and distributors can return end of life electrical and electronic equipment".

These requirements pose a difficult challenge for equipment producers. Currently, a "disconnect" is formed between electronic equipment producers and users at the point of sale. There is no mechanism for producers to obtain information on equipment condition or to communicate with equipment users at key points in the equipment life-cycle. Clearly, the ability to predict end-of-life equipment events and location of those events would hold business value to producers faced with extended producer responsibility. For example, predictive information would enable: efficient operation of end-of-life equipment recycling facilities; the ability to inform equipment users of recycling/disposal options in a timely manner; and the ability to build customer loyalty by communicating information on equipment trade-in promotions at relevant points in the equipment life-cycle.

The concept of recording operational data within equipment products is well known. Car odometers and electronic green-ports are examples that exist today. See for example U.S. Pat. No. 5,654,902 issued Aug. 5, 1997 to Scheidt et al., entitled "Recyclable Component with Data Storage for Storing Information for Examining the Component and Product Including Such a Component." These green-port indicators provide valuable information to recyclers and second market users at the end of equipment life, but do not provide information to manufacturers during the life of the product.

Another reason, apart from environmental concerns for monitoring equipment, such as consumer electronics, is to identify technically obsolete versions of the equipment and alert users to the existence of improved versions of the equipment or associated software, or to notify owners of recalls of defective products. This function is presently handled by a product registration process wherein the owner of the equipment fills out a product registration card and returns it to the manufacturer. A shortcoming of this approach is that many customers of consumer electronics fail to return the registration cards. Even when the cards are returned, the information quickly becomes dated and is no longer useful to the manufacturer. Furthermore, the information is limited and does not contain any information about the frequency and conditions of use of the product that may affect its useful life.

There is need therefore for an improved system for monitoring the life cycle of electronic equipment, particularly consumer electronic equipment.

SUMMARY OF THE INVENTION

The need is met according to the present invention by providing a system for monitoring the life cycle of an electronic apparatus of the type that creates an output data record such as an exposed photographic film, or a digital data, sound or image file and that includes a sensor in the electronic apparatus for monitoring the operation and condition of the apparatus to produce operational data; means in the electronic apparatus for appending the operational data to the data record; a data record utilization device that receives and operates on the data record; and a digital processor in the data record utilization device having a software agent that retrieves the operational data from the data record, processes the operational data and produces a message related to the life cycle of the product.

Advantages:

Advantages of the present invention include:

1) Enabling extended producer responsibility. Extended producer responsibility is expected to be required by the European WEEE Directive beginning in 2003. Similar requirements are expected to emerge shortly thereafter in other markets such as Japan. The current draft of the WEEE directive requires equipment producers to set up systems so that last holders and distributors can return end of life electrical and electronic equipment. Through the use of the present invention, an equipment producer could provide timely information on trade-in or disposal options to owners as products approach the end of their useful life. Similarly, the producer could use the present invention to predict the timing and location of future service calls and/or end-of-life events.

2) Enabling ongoing customer ⇆ producer contact. Communications between customer and producer are important to ensure customer loyalty. The present invention could be used to augment the current system of product registration cards and focus groups by triggering periodic communications between customer and producer as equipment is used. Communications could include, but are not limited to: equipment trade-up promotions, consumable discounts for high-use customers, notification of change in ownership, and quantitative voice-of-customer data.

DETAILED DESCRIPTION OF THE INVENTION

The life cycle monitor concept of the present invention bridges the current disconnect between equipment producers and users, thereby enabling producers to meet growing expectations of extended producer responsibility. The present invention is applicable to electronic apparatus that generate output data records during normal operation. Such apparatus may include but are not limited to conventional film cameras, digital cameras, compact disc writers, and sound recording devices. The concept involves measuring and recording operational data relating to the operation and condition of the electronic apparatus in a form that can be recognized and acted upon by software agents. Examples of such operational data include, but are not limited to the number of images captured by a camera, the number of flash operations performed by the camera, circuit parameters (such as an open circuit or a short circuit), maximum temperature, maximum humidity, maximum physical acceleration, electric shock, exposure to harmful radiation, power consumption, voltage, or power supply condition. According to the invention, software agents are provided to respond to the operational data by: a) providing relevant information to the equipment user and/or; b) providing relevant information to the supply chain (the equipment producer, distributor, retailer, etc.). The software agents may reside within a microprocessor in the equipment product itself or within a computer or microprocessor in other products or at other locations in the overall system.

Figure 1:
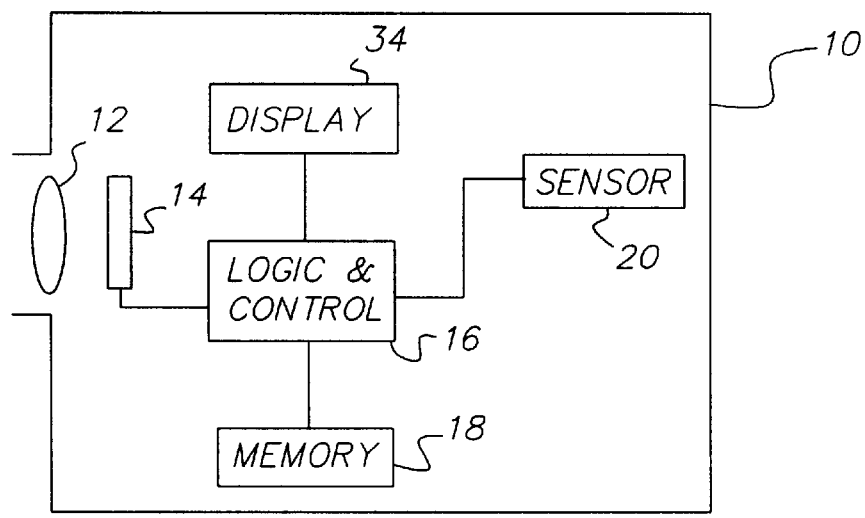
FIG. 1 is a schematic diagram of a digital camera including a sensor useful in the life cycle monitoring system of the present invention.

Referring to FIG. 1, according to one embodiment of the invention, an electronic apparatus, such as a digital camera 10 includes a taking lens 12, an electronic image sensor 14, logic and control circuitry 16, a memory 18, and a sensor 20 such as a software-accessible counter or other indicator of how much the device and/or its individual components have been used. The logic and control circuitry 16 includes a digital processor that stores a count from the counter as meta-data in an output data record (e.g. digital image file) that is generated by the camera 10 and stored in the memory 18. Memory 18 can be, for example, a removable storage device such a compact flash card.

Figure 2:
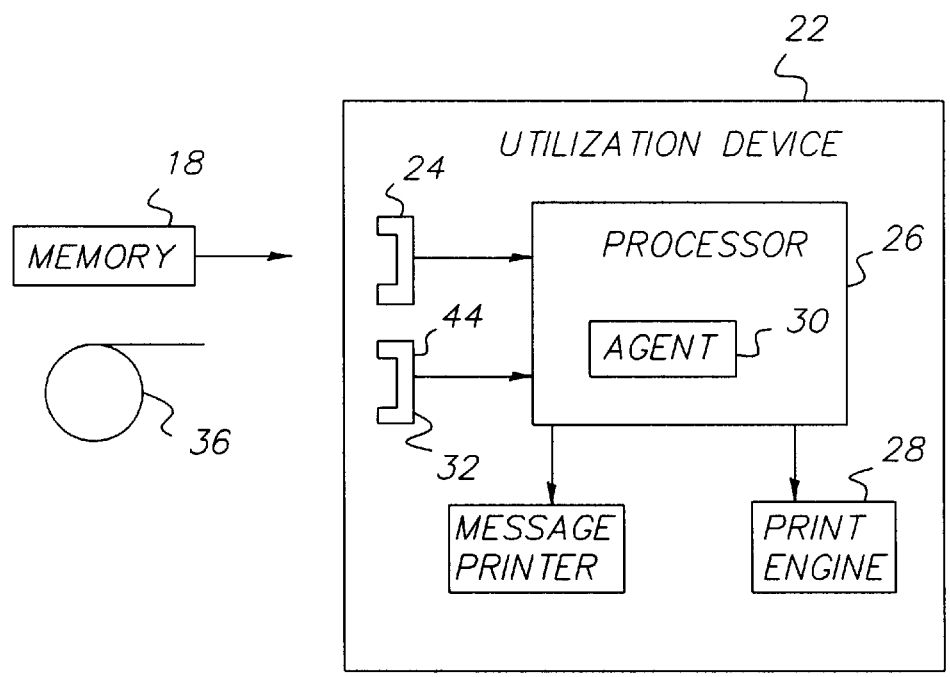
FIG. 2 is a schematic diagram of a utilization device useful in the life cycle monitoring system of the present invention.

Referring to FIG. 2, one or more data record utilization devices 22, such as a personal printer, or a commercial photofinishing printer in the imaging system receives the output data record from the memory 18 and operates on it, for example by making a hard copy print of an image contained in the data record. The data record utilization device 22 includes an interface 24 for receiving the data record from the memory 18. This interface can be direct, such as a card reader, or indirect, such as a network or wireless connection. The device 22 includes a digital processor, such as a micro processor or digital computer 26 that controls a print engine 28 to print the digital image. The processor 26 contains, among other software an agent 30 that checks the operational data from the data record and produces a message related to the life cycle of the camera 10 when the operational data reaches a predetermined value. The message can take the form of a printed message that is produced by print engine 28, or in the case of a commercial photofinishing operation, on a separate message printer 32. This message is then returned to the photographer in a photofinishing envelope along with her prints. In one embodiment, the camera includes sensor(s) for monitoring the camera's operating software version, and the message is a notice that informs the owner of upgrade options when the software version becomes out-of-date. According to a further embodiment, the camera includes sensor(s) for monitoring the camera's hardware configuration, and the message is a notice that informs the owner of product recall(s) when applicable.

Additionally, an agent similar to agent 30 can reside in the logic and control circuit 16 of the camera 10 and produce a message for the camera user on a display 34 on the camera 10.

Alternatively, the utilization device 22 is a personal computer that is used to store, process, and communicate the images captured by a digital camera. The sensor 20 is a counter that counts the number of times that the camera is actuated, and the operational data produced by the sensor is used to track the percentage of useful life remaining in the camera (ratio of number of images captured to expected duty cycle). The camera records the operational data as meta-data contained in the digital image file. The agent 30 is embedded in image download software (i.e. Picture. Easy™ provided by Eastman Kodak Company, Rochester N.Y.) to read the operational data as images are transferred from the memory 18 (Compact Flash Card) to the personal computer. When the percentage of useful life remaining in the camera reaches a pre-determined level, relevant information is provided to the owner via the monitor on the personal computer. The information may include reference to a location on the world wide web for details on promotional offers (camera trade-ups, film discounts, software upgrades, etc.), camera disposal options, customer feedback opportunities, renewal of product registration, etc. Additionally, the information can be provided via the camera's LCD display as noted above.

Figure 3:
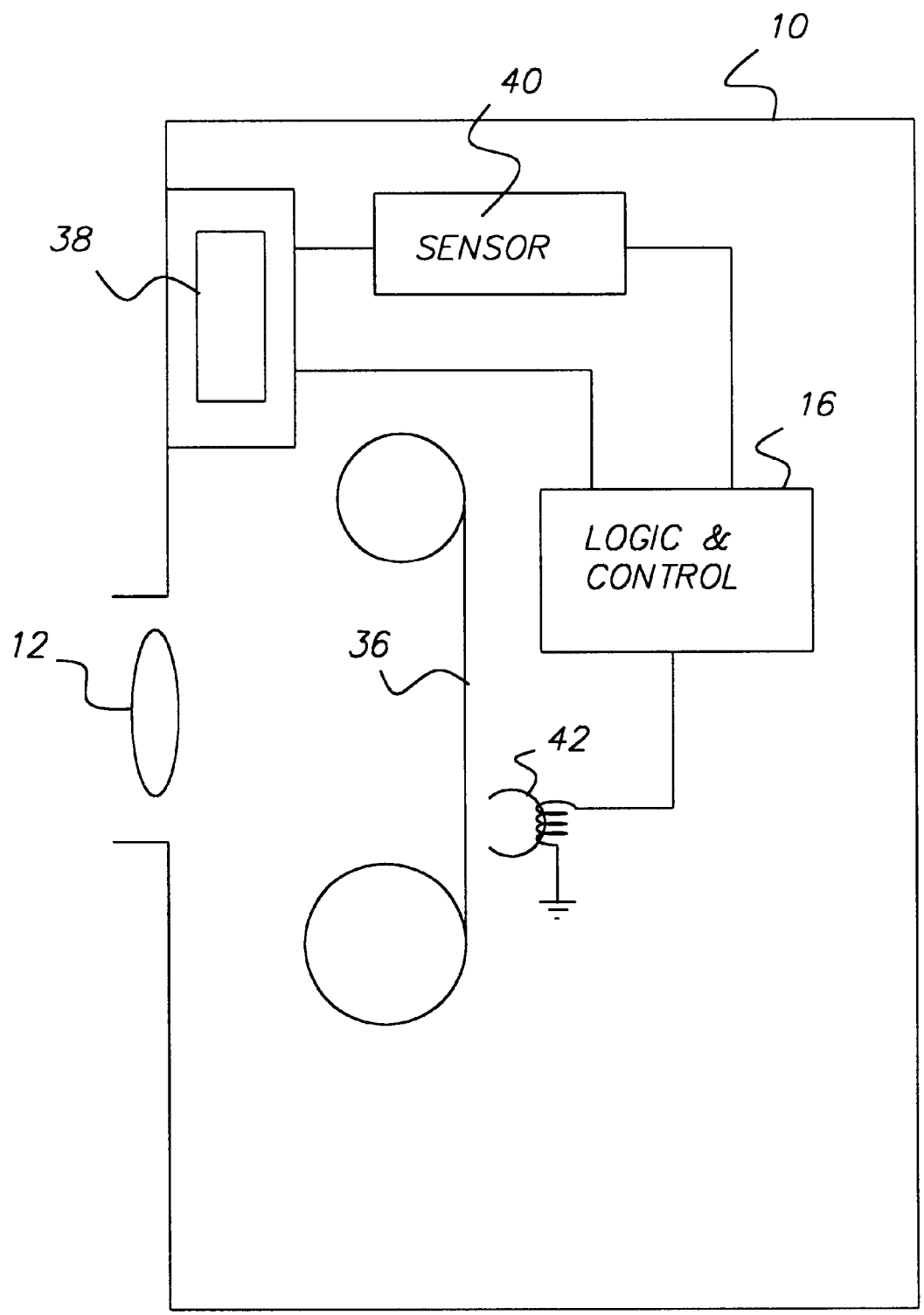
FIG. 3 is a schematic diagram of a film camera including a sensor useful in the life cycle monitoring system of the present invention.

Referring to FIG. 3, according to an alternative embodiment of the invention, the camera 10 is a film camera having the capability of storing data on photographic film 36. An example of such a camera is an Advanced Photo System (APS) camera that uses film having a magnetic layer for storing data in addition to the images stored on the photographic film. The present invention is used in this example to track electronic parameters for condition indicators, such as the number of times that a flash tube 38 has been fired. A circuit condition indicator, such as a sensor 40 that senses the firing of the flash tube 38 and keeps a running record of the number of times that the flash has been fired, monitors the condition of a circuit in the camera. The sensor 38 is connected to a logic and control circuit 16. The value of the circuit condition indicator(s) is written as operating data to the magnetic layer on the film 36 by a magnetic recording head 42.

Referring to FIG. 2, one or more data record utilization devices 22, such as a commercial photofinishing printer, receives the output data record (film 36) and operates on it, for example by scanning the film to produce a digital image and reading the magnetic data on the film in a film reader 44, and making a hard copy print of an image contained in the data record. The utilization device 22 includes a digital processor, such as a micro processor or digital computer 26 that controls a print engine 28 to print the digital image. The processor 26 contains, among other software an agent 28 that checks the operational data from the data record and produces a message related to the camera circuit condition indicators when the value of the operational data fall above or below predetermined limit(s). The message can take the form of a printed message that is produced by print engine 28, or in the case of a commercial photofinishing operation, on a separate message printer 32. This message is then returned to the photographer in a photofinishing envelope along with her prints.

Additionally, an agent similar to agent 30 can reside in the logic and control circuit 16 of the camera 10 and produce a message for the camera user on a display 34 on the camera 10.

The invention has been described in detail with particular reference to certain preferred embodiments thereof, but it will be understood that variations and modifications can be effected within the spirit and scope of the invention.

Parts List 10 camera
12 taking lens 14 image sensor
16 logic and control circuit
18 memory
20 sensor
22 data record utilization device
24 interface
26 digital computer
28 print engine
30 software agent
32 message printer
34 display
36 photographic film
38 flash tube
40 sensor
42 magnetic recording head
44 film reader

What is claimed is:

1. A system for monitoring the life cycle of an electronic image capture apparatus of the type that creates an output image data record that is periodically delivered to an image processing location for processing, comprising:
   a) a sensor in the electronic image capture apparatus for monitoring the operation and condition of the apparatus to produce operational data;
   b) means in the electronic capture apparatus for appending the operational data to the output image data record;
   c) an image data record utilization device located at the image processing location that receives and operates on the image data record; and
   d) a digital processor in the image data record utilization device having a software agent that retrieves the operational data from the image data record, processes the operational data and produces a message related to the life cycle of the electronic image capture apparatus, whereby the message can be provided back to the user of the image capture apparatus along with the processed images from the image capture apparatus.

2. The system claimed in claim 1, wherein the electronic image capture apparatus is an APS camera, the image data record is APS film having a magnetic recording layer thereon, the operational data is recorded on the magnetic layer of the film, and the data record utilization device is a photofinishing apparatus.

3. The system claimed in claim 2, wherein the camera includes a flash mechanism, the sensor senses the number of flashes executed by the camera, and the message is a notice that the camera is approaching the end of its useful life when the number of flashes exceeds a predetermined number.

4. The system claimed in claim 2 wherein the camera includes sensor(s) for monitoring electronic parameters, the sensor senses circuit conditions, and the message is a notice that informs the owner of corrective action(s) or recommended disposal options when circuit conditions are not within operating limits.

5. The system claimed in claim 1, wherein the electronic image capture apparatus is a digital camera, the data record is a digital image produced by the camera, the operational data is stored as a meta data file with the digital image on a digital storage medium, and the data record utilization device is a personal computer and/or a desktop or commercial digital image printer.

6. The system claimed in claim 5, wherein the camera includes a flash mechanism, the sensor senses the number of flashes executed by the camera, and the message is a notice that the camera is approaching the end of its useful life when the number of flashes exceeds a predetermined number.

7. The system claimed in claim 5 wherein the camera includes sensor(s) for monitoring electronic parameters, the sensor senses circuit conditions, and the message is a notice that informs the owner of corrective action(s) or recommended disposal options when circuit conditions are not within operating limits.

8. The system claimed in claim 5 wherein the camera includes sensor(s) for monitoring the camera's operating software version, and the message is a notice that informs the owner of upgrade options when the software version becomes out-of-date.

9. The system claimed in claim 5 wherein the camera includes sensor(s) for monitoring the camera's hard ware configuration, and the message is a notice that informs th e owner of product recall(s) when applicable.

10. A method for monitoring the life cycle of an electronic image capture apparatus of the type that creates an output image data record that is periodically delivered to an image processing location for processing, comprising the steps of:
   a) sensing the operation and condition of the image capture apparatus to produce operational data;
   b) appending the operational data to the output image data record;
   c) receiving the output image data record in a data record utilization device located at the image processing location;
   d) retrieving the operational data from the output image data record, processing the operational data and producing a message related to the life cycle of the product and;
   e) sending the message back to the user of the image capture apparatus along with the processed images from the image capture apparatus.

11. The method claimed in claim 10, wherein the electronic image capture apparatus is an APS camera, the data record is APS film having a magnetic recording layer thereon, the operational data is recorded on the magnetic layer of the film, and the data record utilization device is a photofinishing apparatus.

12. The method claimed in claim 11, wherein the camera includes a flash mechanism, the sensor senses the number of flashes executed by the camera, and the message is a notice that the camera is approaching the end of its useful life when the number of flashes exceeds a predetermined number.

13. The method claimed in claim 11 wherein the camera includes sensor(s) for monitoring electronic parameters, the sensor senses circuit conditions, and the message is a notice that informs the owner of corrective action(s) or recommended disposal options when circuit conditions are not within operating limits.

14. The method claimed in claim 10, wherein the electronic image capture apparatus is a digital camera, the image data record is a digital image produced by the camera, the operational data is stored as a meta data file with the digital image on a digital storage medium, and the data record utilization device is a personal computer and/or a desktop or commercial digital image printer.

15. The method claimed in claim 14, wherein the camera includes a flash mechanism, the sensor senses the number of flashes executed by the camera, and the message is a notice that the camera is approaching the end of its useful life when the number of flashes exceeds a predetermined number.

16. The method claimed in claim 14 wherein the camera includes sensor(s) for monitoring electronic parameters, the sensor senses circuit conditions, and the message is a notice that informs the owner of corrective action(s) or recommended disposal options when circuit conditions are not within operating limits.

17. Electronic image capture apparatus of the type that creates an output image data record, comprising:
   a) a sensor for monitoring the operation and condition of the image capture apparatus to produce operational data relating to the life cycle of the image capture apparatus; and
   b) means for appending the operational data to the output image data record.

18. The electronic apparatus claimed in claim 17, wherein the electronic image capture apparatus is an APS camera, the data record is APS film having a magnetic recording layer thereon, and the operational data is recorded on the magnetic layer of the film.

19. The electronic apparatus claimed in claim 18, wherein the APS camera includes a flash mechanism, and the sensor senses the number of flashes executed by the camera.

20. The electronic apparatus claimed in claim 17, wherein the electronic image capture apparatus is a digital camera, the data record is a digital image produced by the camera, and the operational data is stored as a meta data file with the digital image on a digital storage medium.

21. The electronic apparatus claimed in claim 20, wherein the camera includes a flash mechanism, and the sensor senses the number of flashes executed by the camera.

22. An image data record utilization device adapted to operate on an image data record produced by an electronic image capture apparatus that creates an output image data record that includes operational data relating to the life cycle of the electronic apparatus, comprising:
   a) means for receiving the image data record; and
   b) a digital processor in the image data record utilization device having a software agent that retrieves the operational data from the image data record, processes the operational data and produces a message related to the life cycle of the product.

* * * * *